United States Patent
Hier et al.

(10) Patent No.: US 7,458,604 B2
(45) Date of Patent: Dec. 2, 2008

(54) AUTOMOTIVE TRIM ASSEMBLY HAVING AN INTEGRATED AIRBAG DOOR

(75) Inventors: Michael J Hier, Milford, MI (US); Glenn A Cowelchuk, Chesterfield Township, MI (US); Randy S Reed, Fair Haven, MI (US); David Dooley, Troy, MI (US); Todd L DePue, Brighton, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 250 days.

(21) Appl. No.: 10/904,032

(22) Filed: Oct. 20, 2004

(65) Prior Publication Data

US 2006/0082106 A1     Apr. 20, 2006

(51) Int. Cl.
    *B60R 21/20*     (2006.01)
(52) U.S. Cl. .................................. 280/728.3
(58) Field of Classification Search ............. 280/728.3, 280/731, 732
See application file for complete search history.

(56) References Cited

U.S. PATENT DOCUMENTS

| | | | |
|---|---|---|---|
| 3,400,979 A | 9/1968 | James | 297/412 |
| 3,833,964 A | 9/1974 | Harcourt | |
| 4,124,308 A | 11/1978 | Sokolow | |
| 4,330,584 A | 5/1982 | Doerer | |
| 4,470,936 A | 9/1984 | Potter | |
| 4,543,366 A | 9/1985 | Smith | |
| 4,766,025 A | 8/1988 | Sanok et al. | |
| 4,781,956 A | 11/1988 | Zimmermann et al. | 429/43 |
| 4,783,114 A | 11/1988 | Welch | |
| 4,810,452 A | 3/1989 | Taillefert et al. | 264/247 |
| 4,929,017 A | 5/1990 | Lilienthal et al. | |
| 4,952,358 A | 8/1990 | Okina et al. | |

(Continued)

FOREIGN PATENT DOCUMENTS

DE      3711079      10/1988

(Continued)

OTHER PUBLICATIONS

*Combined Search and Examination Report under Sections 17 and 18(3)*, The UK Patent Office.

(Continued)

*Primary Examiner*—Kevin Hurley
*Assistant Examiner*—Robert A. Coker
(74) *Attorney, Agent, or Firm*—Wood, Herron & Evans, L.L.P.

(57) ABSTRACT

An automotive trim assembly adapted to have an airbag deploy through the trim assembly includes a substrate with a deployment door integrally molded with the substrate and having a front surface adapted to face the interior of the automobile and a back surface opposite the front surface. The airbag is adapted to be stored behind the deployment door, which is adapted to open when the airbag is deployed. A cover is molded onto at least a portion of the substrate and deployment door and includes an inner and outer layer of a polymer material having a substantially non-cellular structure and an inner core having a cellular structure positioned between the inner and outer layers. The cover is adapted to keep the door attached to the trim assembly when the airbag is deployed.

14 Claims, 4 Drawing Sheets

U.S. PATENT DOCUMENTS

| | | | |
|---|---|---|---|
| 4,958,883 A | 9/1990 | Iwaki et al. | |
| 5,002,307 A | 3/1991 | Heidorn | |
| 5,040,335 A | 8/1991 | Grimes | 49/502 |
| 5,071,605 A | 12/1991 | Kawaguchi et al. | 264/45.2 |
| 5,073,318 A | 12/1991 | Rohrlach et al. | 264/46.5 |
| 5,096,221 A | 3/1992 | Combs et al. | |
| 5,141,279 A | 8/1992 | Weller | |
| 5,224,299 A | 7/1993 | Abe | 49/502 |
| 5,297,842 A | 3/1994 | Hayashi | |
| 5,382,047 A | 1/1995 | Gajewski | |
| 5,387,390 A | 2/1995 | Kornylo | 264/46.8 |
| 5,395,135 A | 3/1995 | Lim et al. | |
| 5,399,393 A | 3/1995 | Zoller | |
| 5,407,225 A | 4/1995 | Cooper | |
| 5,433,910 A | 7/1995 | Mukai et al. | |
| 5,445,430 A | 8/1995 | Nichols | 296/153 |
| 5,456,490 A * | 10/1995 | Carter et al. | 280/728.3 |
| 5,474,841 A | 12/1995 | Matsuki et al. | 428/304.4 |
| 5,484,561 A | 1/1996 | Weber et al. | |
| 5,502,942 A | 4/1996 | Gras et al. | |
| 5,527,084 A | 6/1996 | Scherf | |
| 5,536,351 A | 7/1996 | Rheinlander et al. | 156/212 |
| 5,562,797 A | 10/1996 | Phelps | |
| 5,571,581 A | 11/1996 | Koizumi et al. | |
| 5,571,597 A | 11/1996 | Gallagher et al. | 428/152 |
| 5,573,617 A | 11/1996 | Franck et al. | 156/196 |
| 5,582,789 A | 12/1996 | Stein et al. | |
| 5,590,901 A | 1/1997 | MacGregor | 280/728.3 |
| 5,591,078 A | 1/1997 | Filion et al. | |
| 5,626,382 A | 5/1997 | Johnson et al. | 296/146.7 |
| 5,651,998 A | 7/1997 | Bertschi et al. | |
| 5,663,210 A | 9/1997 | Sugimoto et al. | 521/81 |
| 5,679,296 A | 10/1997 | Kelman et al. | |
| 5,692,711 A | 12/1997 | Tucker | 248/118 |
| 5,698,283 A * | 12/1997 | Yamasaki et al. | 428/43 |
| 5,702,810 A | 12/1997 | Koseki et al. | |
| 5,709,912 A | 1/1998 | Goto et al. | |
| 5,709,925 A | 1/1998 | Spengler et al. | 428/198 |
| 5,715,966 A | 2/1998 | Nagano et al. | 220/339 |
| 5,744,077 A | 4/1998 | Grisch et al. | |
| 5,779,262 A * | 7/1998 | Totani et al. | 280/728.3 |
| 5,783,293 A | 7/1998 | Lammi | |
| 5,786,047 A | 7/1998 | Tomblin | |
| 5,792,413 A | 8/1998 | Ang et al. | 264/515 |
| 5,799,385 A | 9/1998 | Vecchiarino et al. | 29/469 |
| 5,803,415 A | 9/1998 | Konishi et al. | 248/18 |
| 5,810,388 A | 9/1998 | Berardi et al. | 280/728.3 |
| 5,816,609 A | 10/1998 | Gray et al. | 280/728.3 |
| 5,837,172 A | 11/1998 | Pritchard et al. | |
| 5,839,752 A * | 11/1998 | Yamasaki et al. | 280/728.3 |
| 5,868,455 A | 2/1999 | Springer et al. | |
| 5,904,370 A | 5/1999 | Steiner et al. | |
| 5,934,730 A | 8/1999 | Yagishita et al. | |
| 5,941,557 A | 8/1999 | Mullins, Jr. et al. | |
| 5,951,094 A | 9/1999 | Konishi et al. | 296/153 |
| 5,976,289 A | 11/1999 | Kawakubo et al. | 156/78 |
| 5,979,931 A * | 11/1999 | Totani et al. | 280/728.3 |
| 5,995,380 A | 11/1999 | Maue et al. | 361/826 |
| 6,003,716 A | 12/1999 | Allison et al. | 220/326 |
| 6,012,735 A | 1/2000 | Gray et al. | 280/728.2 |
| 6,013,210 A | 1/2000 | Gardner, Jr. | 264/40.1 |
| 6,017,617 A | 1/2000 | Gardner, Jr. | 428/309.9 |
| 6,042,139 A | 3/2000 | Knox | |
| 6,070,905 A | 6/2000 | Renault | |
| 6,092,858 A | 7/2000 | Bolwell | |
| 6,116,672 A | 9/2000 | Cannon et al. | |
| 6,129,378 A * | 10/2000 | Goto et al. | 280/728.3 |
| 6,129,870 A | 10/2000 | Hettinga | |
| 6,129,960 A | 10/2000 | Kudert et al. | |
| 6,136,415 A | 10/2000 | Spengler | |
| 6,149,853 A | 11/2000 | Luckett et al. | 264/266 |
| 6,158,766 A | 12/2000 | Kowalski | |
| 6,168,188 B1 | 1/2001 | Preisler et al. | 280/728.3 |
| 6,186,582 B1 | 2/2001 | Beckmann | |
| 6,210,613 B1 | 4/2001 | Stein et al. | 264/45.4 |
| 6,210,614 B1 | 4/2001 | Gardner, Jr. et al. | |
| 6,213,506 B1 | 4/2001 | Swann et al. | |
| 6,213,538 B1 | 4/2001 | Scheidmantel et al. | |
| 6,214,157 B1 | 4/2001 | Spengler | 156/304.6 |
| 6,217,098 B1 | 4/2001 | O'Brien et al. | 296/70 |
| 6,248,200 B1 | 6/2001 | Dailey et al. | 156/245 |
| 6,251,326 B1 | 6/2001 | Siano et al. | 264/328.8 |
| 6,267,918 B1 | 7/2001 | Bauer | |
| 6,308,488 B1 | 10/2001 | Hoshino | |
| 6,319,438 B1 | 11/2001 | Smith et al. | 264/75 |
| 6,322,738 B1 | 11/2001 | Sicilia et al. | |
| 6,357,788 B2 * | 3/2002 | Kreile | 280/728.3 |
| 6,364,351 B1 | 4/2002 | Hier et al. | 280/732 |
| 6,368,093 B1 | 4/2002 | Vecchiarino et al. | 425/130 |
| 6,391,232 B1 | 5/2002 | Fritsch | 264/46.6 |
| 6,402,189 B1 | 6/2002 | Gray et al. | |
| 6,409,947 B1 | 6/2002 | Wandyez | |
| 6,431,600 B1 | 8/2002 | Freisler et al. | |
| 6,433,728 B1 | 8/2002 | Krupp et al. | 341/176 |
| 6,440,514 B1 * | 8/2002 | Ueno et al. | 428/43 |
| 6,453,535 B1 | 9/2002 | Nicholas | |
| 6,474,724 B2 | 11/2002 | Lemmon et al. | 296/189 |
| 6,479,114 B2 | 11/2002 | Mizuno et al. | |
| 6,485,072 B1 | 11/2002 | Werner et al. | |
| 6,495,722 B1 | 12/2002 | Zimmerman et al. | |
| 6,517,144 B2 | 2/2003 | Kobayashi | |
| 6,544,449 B1 | 4/2003 | Gardner | 264/46.5 |
| 6,554,350 B2 | 4/2003 | Takahara | |
| 6,568,707 B2 | 5/2003 | Hier et al. | 280/732 |
| 6,569,365 B1 | 5/2003 | Mizuno et al. | |
| 6,572,300 B2 | 6/2003 | Altonen et al. | |
| 6,615,546 B2 | 9/2003 | Furuyama et al. | |
| 6,616,216 B1 | 9/2003 | Furuyama et al. | |
| 6,627,134 B2 | 9/2003 | Thomson | |
| 6,644,727 B2 | 11/2003 | Audibert et al. | |
| 6,652,793 B2 | 11/2003 | Corrion et al. | 264/242 |
| 6,657,158 B1 * | 12/2003 | Skelly et al. | 219/121.71 |
| 6,660,781 B1 | 12/2003 | Ghobary et al. | |
| 6,669,228 B2 * | 12/2003 | Shah et al. | 280/728.3 |
| 6,688,640 B1 | 2/2004 | Davis, Jr. et al. | 280/728.3 |
| 6,706,365 B2 | 3/2004 | Akasaka et al. | |
| 6,708,462 B2 | 3/2004 | Pokorzynski et al. | |
| 6,740,390 B2 | 5/2004 | Randazzo | 428/122 |
| 6,742,830 B2 | 6/2004 | Zimmerman et al. | |
| 6,746,067 B2 | 6/2004 | Schmidt et al. | |
| 6,749,794 B2 | 6/2004 | Spengler | |
| 6,753,057 B1 * | 6/2004 | Gardner, Jr. | 428/43 |
| 6,756,004 B2 | 6/2004 | Davis, Jr. et al. | 264/255 |
| 6,758,510 B1 | 7/2004 | Starling | 296/39.1 |
| 6,761,388 B2 | 7/2004 | Lein et al. | 296/24.34 |
| 6,764,621 B2 | 7/2004 | Schwaighofer | |
| 6,764,633 B2 * | 7/2004 | Takahashi et al. | 264/259 |
| 6,793,181 B2 | 9/2004 | Hallock | |
| 6,827,799 B2 | 12/2004 | Zimmer et al. | |
| 6,837,544 B2 | 1/2005 | Bornchen et al. | |
| 6,857,688 B2 | 2/2005 | Morrison et al. | |
| 6,875,484 B1 | 4/2005 | Kogure et al. | |
| 6,899,363 B2 | 5/2005 | Dry | |
| 6,899,373 B2 | 5/2005 | Kim | |
| 6,921,571 B2 | 7/2005 | Funakoshi | |
| 6,929,309 B1 | 8/2005 | Radu et al. | |
| 6,955,392 B2 | 10/2005 | Dry | |
| 6,981,735 B1 | 1/2006 | Stephens | |
| 6,983,967 B2 | 1/2006 | Scheidmantal et al. | |
| 6,991,841 B2 | 1/2006 | Cowelchuk et al. | |
| 7,005,092 B2 | 2/2006 | Dooley et al. | |
| 7,018,702 B2 | 3/2006 | Hacke | |
| 7,045,206 B1 | 5/2006 | Granata et al. | |
| 7,051,438 B2 | 5/2006 | O'Brien et al. | |

| | | | | | |
|---|---|---|---|---|---|
| 7,055,850 B2 * | 6/2006 | Freystedt ............... 280/728.3 | GB | 2 419 106 | 4/2006 |
| 7,108,312 B2 | 9/2006 | Cowelchuk et al. | GB | 2 419 317 | 4/2006 |
| 7,156,437 B2 | 1/2007 | Cowelchuk et al. | GB | 2 419 318 | 4/2006 |
| 2001/0030436 A1 | 10/2001 | Kifer et al. ............... 296/24.1 | GB | 2 419 319 | 4/2006 |
| 2001/0047899 A1 | 12/2001 | Ikeda ...................... 180/90 | GB | 2419322 | 4/2006 |
| 2002/0041912 A1 | 4/2002 | Thomson | JP | 62170303 | 7/1987 |
| 2002/0043861 A1 | 4/2002 | Meadows ............... 297/411.21 | JP | 6382847 | 4/1988 |
| 2002/0066972 A1 | 6/2002 | Fritsch .................... 264/46.4 | JP | 5237871 | 9/1993 |
| 2002/0079603 A1 | 6/2002 | Bemis et al. | JP | 8011145 | 1/1996 |
| 2002/0153741 A1 | 10/2002 | Speelman et al. ............ 296/70 | JP | 8026054 | 1/1996 |
| 2002/0195844 A1 | 12/2002 | Hipwell .................... 296/214 | JP | 8183059 | 7/1996 |
| 2003/0011174 A1 * | 1/2003 | Merrifield et al. ......... 280/728.3 | JP | 10291431 | 11/1998 |
| 2003/0011214 A1 | 1/2003 | Gupte et al. ............... 296/214 | JP | 11070604 | 3/1999 |
| 2003/0017224 A1 | 1/2003 | Byma et al. | JP | 11123999 | 5/1999 |
| 2003/0057739 A1 | 3/2003 | Luzt et al. ................. 296/214 | JP | 11291288 | 10/1999 |
| 2003/0075833 A1 | 4/2003 | Thomson | JP | 2000016216 | 1/2000 |
| 2003/0121877 A1 | 7/2003 | Brozell et al. | JP | 2003103676 | 4/2003 |
| 2003/0155787 A1 | 8/2003 | Lein et al. ................. 296/24.1 | JP | 2003266464 | 9/2003 |
| 2003/0176575 A1 | 9/2003 | Sugimoto et al. | JP | 2003266476 | 9/2003 |
| 2003/0176576 A1 | 9/2003 | Fujita et al. | JP | 2005119404 | 5/2005 |
| 2003/0184064 A1 | 10/2003 | Hier et al. ................. 280/732 | WO | 01/25055 | 4/2001 |
| 2003/0184108 A1 | 10/2003 | Donovan et al. ........... 296/24.1 | | | |
| 2003/0209888 A1 | 11/2003 | Davis, Jr. et al. ......... 280/728.3 | | | |
| 2003/0209890 A1 | 11/2003 | Totani et al. | | | |
| 2003/0209892 A1 | 11/2003 | Hier et al. ................. 280/732 | | | |
| 2004/0017023 A1 | 1/2004 | Schoemann et al. ......... 264/245 | | | |
| 2004/0029986 A1 | 2/2004 | Ghobary et al. | | | |
| 2004/0032055 A1 | 2/2004 | Cavallaro et al. | | | |
| 2004/0119267 A1 | 6/2004 | Cowelchuck et al. ..... 280/728.3 | | | |
| 2004/0119268 A1 | 6/2004 | Davis, Jr. et al. ......... 280/728.3 | | | |
| 2004/0130051 A1 | 7/2004 | Cowelchok et al. ........ 264/46.4 | | | |
| 2004/0202824 A1 | 10/2004 | Hayashi et al. | | | |
| 2004/0222619 A1 * | 11/2004 | DePue et al. ................ 280/732 | | | |
| 2005/0046075 A1 | 3/2005 | Youngs et al. | | | |
| 2005/0079336 A1 | 4/2005 | Dry et al. | | | |
| 2005/0183239 A1 | 8/2005 | Chen | | | |
| 2005/0183897 A1 | 8/2005 | DePue | | | |
| 2005/0186388 A1 | 8/2005 | Mekas et al. | | | |
| 2005/0194806 A1 | 9/2005 | Cowelchuk et al. | | | |
| 2005/0258569 A1 | 11/2005 | Schoemann et al. | | | |
| 2005/0258666 A1 | 11/2005 | Reed | | | |
| 2006/0082173 A1 | 4/2006 | Cowelchuk et al. | | | |
| 2006/0082190 A1 | 4/2006 | Cowelchuk et al. | | | |
| 2006/0216479 A1 | 9/2006 | Cowelchuk et al. | | | |

FOREIGN PATENT DOCUMENTS

| | | |
|---|---|---|
| DE | 19534982 | 3/1996 |
| DE | 4480340 | 12/1996 |
| DE | 19733667 | 2/1999 |
| DE | 19934249 | 7/1999 |
| DE | 198 14 956 | 10/1999 |
| DE | 10123207 | 5/2001 |
| DE | 10104036 | 8/2001 |
| DE | 101 20 268 | 12/2001 |
| DE | 101 60 173 | 6/2003 |
| DE | 103 58 011 | 9/2004 |
| DE | 10 2004 023 823 | 12/2004 |
| DE | 601 06 159 | 9/2005 |
| EP | 0408202 | 1/1991 |
| EP | 0410553 | 1/1991 |
| EP | 0749872 | 3/2000 |
| EP | 1086863 | 3/2001 |
| EP | 1182024 | 2/2002 |
| EP | 1580077 | 9/2005 |
| FR | 2771356 | 11/1997 |
| FR | 2796610 | 1/2001 |
| GB | 2403683 | 1/2005 |

OTHER PUBLICATIONS

Office Action issued in related U.S. Appl. No. 10/904,008; dated as mailed on Sep. 10, 2007; 8 pages; USPTO.
Final Office Action issued in related U.S. Appl. No. 10/904,407; dated as mailed on Aug. 28, 2007; 21 pages; USPTO.
Office Action issued in related U.S. Appl. No. 10/904,011; dated as mailed on Aug. 24, 2007; 21 pages; USPTO.
Office Action issued in related U.S. Appl. No. 10/904,408; dated as mailed on Oct. 16, 2007; 7 pages; USPTO.
Office Action issued in related U.S. Appl. No. 10/904,011; dated as mailed on Feb. 29, 2008; 13 pages; U.S. Patent and Trademark Office.
Final Office Action issued in related U.S. Appl. No. 10/904,407; dated as mailed on Mar. 11, 2008; 7 pages; U.S. Patent and Trademark Office.
Office Action issued in related U.S. Appl. No. 10/904,008; dated as mailed on Mar. 17, 2008; 13 pages; U.S. Patent and Trademark Office.
Final Office Action issued in related U.S. Appl. No. 10/904,408; dated as mailed on Mar. 26, 2008; 16 pages; U.S. Patent and Trademark Office.
Final Office Action issued in related U.S. Appl. No. 10/904,010; dated as mailed on May 7, 2008; 10 pages; U.S. Patent and Trademark Office.
Office Action issued in related U.S. Appl. No. 10/904,407; dated as mailed on Jun. 2, 2008; 16 pages; USPTO.
Final Office Action issued in related U.S. Appl. No. 10/904,033; dated as mailed on May 16, 2007; 15 pages; USPTO.
Office Action issued in related U.S. Appl. No. 11/160,088; dated as mailed on Jan. 23, 2007; 25 pages, USPTO.
Office action issued in related U.S. Appl. No. 10/711,692; dated as mailed on Jan. 29, 2007; 51 pages, USPTO.
Final Office Action issued in related U.S. Appl. No. 10/904,011; dated as mailed on Mar. 8, 2007; 21 pages; USPTO.
Final Office Action issued in related U.S. Appl. No. 10/708,312; dated as mailed on Mar. 23, 2007; 10 pages; USPTO.
Final Office Action issued in related U.S. Appl. No. 10/904,008; dated as mailed on Apr. 9, 2007; 7 pages; USPTO.
Final Office Action issued in related U.S. Appl. No. 10/904,408; dated as mailed on Apr. 19, 2007; 28 pages; USPTO.
Office Action issued in related U.S. Appl. No. 10/904,407; dated as mailed on Apr. 13, 2007; 33 pages; USPTO.
Office Action issued in related U.S. Appl. No. 10/904,015; dated as mailed on Apr. 17, 2007; 20 pages; USPTO.

* cited by examiner

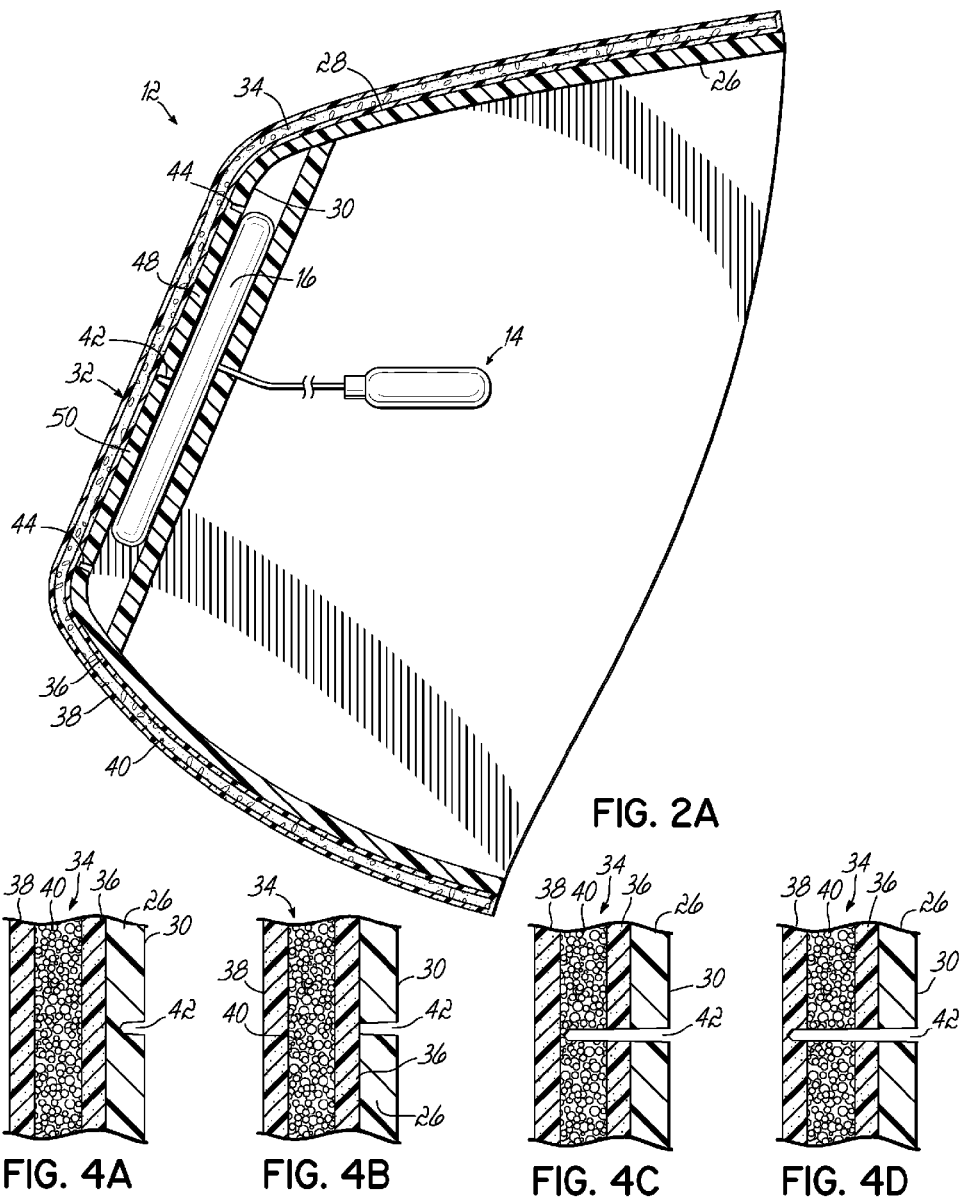

AUTOMOTIVE TRIM ASSEMBLY HAVING AN INTEGRATED AIRBAG DOOR

CROSS-REFERENCE

The present invention is related to U.S. Ser. No. 10/708,312, filed Feb. 24, 2004, U.S. Ser. No. 10/711,692, filed Sep. 30, 2004, U.S. Ser. No. 10/904,007 filed Oct. 19, 2004, U.S. Ser. No. 10/904,008, filed Oct. 19, 2004, U.S. Ser. No. 10/904,010 filed Oct. 19, 2004, U.S. Ser. No. 10/904,011 filed Oct. 19, 2004, U.S. Ser. No. 10/904,015 filed Oct. 19, 2004, U.S. Ser. No. 10/904,033 filed Oct. 20, 2004, U.S. Ser. No. 10/904,407 filed Nov. 9, 2004. U.S. Ser. No. 10/904,408 filed Nov. 9, 2004, U.S. Ser. No. 10/904,409 filed Nov. 9, 2004 and U.S. Ser. No. 10/904,433 filed Nov. 10, 2004.

FIELD OF THE INVENTION

The present invention pertains generally to automotive interior trim assemblies and more particularly to trim assemblies having airbag doors for concealing and deploying an airbag.

BACKGROUND OF THE INVENTION

Motor vehicles include an airbag system consisting of impact sensors, a system controller, an inflator, and the inflatable airbag cushions themselves. The inflatable airbag cushions are stored for deployment at a number of locations inside a motor vehicle and, when deployed into the passenger cabin in the event of a collision, protect the vehicle occupants from injury. For example, inflatable airbag cushions are stored at concealed locations behind deployment doors within the steering wheel for protection of the driver and in the instrument panel for protection of a passenger during a collision event. Airbag systems may also be provided in other trim assemblies throughout the vehicle.

Concealing each airbag cushion is a deployment door that forms an interior portion of the vehicle, such as a portion of the steering wheel hub, instrument panel or other trim assembly. Typically, the deployment door covers an opening through which the airbag cushion is deployed in the event of a collision. When the airbag cushion inflates, the deployment door is opened by the force applied by the inflating airbag cushion against the deployment door.

Designers of interior trim assemblies, however, have been challenged with providing effective deployment of an airbag cushion while providing a pleasing aesthetic appearance of the interior trim assembly through which the airbag cushion deploys. Designers of interior trim assemblies have also been challenged to provide such interior trim assemblies in a cost effective manner. In several designs, a trim assembly has a multi-portion construction, including a retainer portion, which comprises a significant part of the trim assembly, and a deployment door that overlies the airbag cushion located immediately behind the trim assembly. In many of these designs, the trim assembly has a visible seam having a low resistance to normal and shear stresses to allow the airbag cushion to deploy therethrough. This seam clearly distinguishes the deployment door from the retainer portion of the trim assembly and consequently detracts from the aesthetic appearance of the automotive interior.

Another consideration for designers of trim assemblies deals with preventing the deployment door from being ejected into the passenger compartment at a high rate of speed during the deployment of the airbag cushion. Many designs include a hinge mechanism located on the interior or back side of the deployment door adjacent the airbag cushion with one end coupled to the back side of the deployment door and another end coupled to a fixed support. The hinge mechanism is typically placed on the back side of the deployment door so that it is not visible from the passenger compartment and does not detract from the aesthetic appearance of the automotive interior.

For instance, several designs use a tether made of natural fibers, synthetic fibers, thermoplastic materials or other suitable materials, having one end coupled to the deployment door through adhesives, vibration or sonic welding techniques, or other methods. The opposed end of the tether is then attached to the airbag housing or other automotive support. In this way, the tether functions as a hinge that allows, or otherwise facilitates, pivotal movement of the deployment door so as to prevent the door from separating from the trim assembly when the airbag cushion is deployed.

Hinge mechanisms located on the interior side of the deployment door have some drawbacks. In particular, so as to accommodate the pivotal movement of the deployment door, the hinge mechanism may have a loosened or slack region when the airbag cushion is in the stored or non-deployed state. Consequently, the hinge mechanism is susceptible to hinge binding, which may lead to the improper functioning of the airbag system when actuated. Additionally, incorporating a separate hinge mechanism into the airbag system requires additional parts and labor which increase the overall cost of the trim assembly.

There is a need for an improved interior trim assembly having an airbag deployment door that enhances the aesthetic appearance of the automotive interior, increases airbag reliability and reduces the number of parts, labor and overall manufacturing costs.

SUMMARY OF THE INVENTION

The present invention provides an automotive trim assembly having an integrated airbag deployment door that addresses these and other drawbacks of conventional airbag doors and which can be produced in an efficient and cost-effective manner. The trim assembly comprises a substrate having a front surface adapted to face an automotive interior and a back surface opposite to the front surface. An airbag system is stored immediately behind the deployment door and includes an airbag cushion for deployment through the trim assembly. A cover is molded onto at least a portion of the substrate and deployment door and includes an inner and outer layer of a polymer material having a substantially non-cellular structure and a core of polymer material having a cellular structure positioned between the inner and outer layers. The deployment door is adapted to open when the airbag is actuated so that the airbag cushion may expand into the passenger compartment. The cover is adapted to keep the deployment door attached to the trim assembly, so as to prevent the door from being ejected into the passenger compartment.

In one embodiment of the invention, the deployment door is defined by at least one score line and preferably a plurality of score lines formed in the backside of the instrument panel. The score lines may take an H-shaped pattern, a U-shaped pattern or other patterns so as to define the deployment door. The depth and type of the score lines may be configured so that the deployment door opens upon the airbag cushion applying a specified force to the back of the trim assembly. For instance, the depth of the score lines may be configured to extend entirely through the substrate or through the substrate and partially through the cover. Additionally, the score lines may be configured as continuous score lines or intermittent score lines.

The invention provides an automotive interior trim assembly adapted to have an airbag deploy therethrough that increases airbag reliability and that reduces the number of parts and labor required for assembly thereof, thereby reducing overall manufacturing costs. The trim assembly also provides an aesthetically pleasing appearance and lacks visible weakened regions. These and other objects and advantages of the invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 2A is a cross-sectional view taken generally along line 2A-2A in FIG. 1;

FIGS. 4A-4D are cross-sectional views of the instrument panel illustrating possible depths of the score lines;

DETAILED DESCRIPTION

Figure 1:
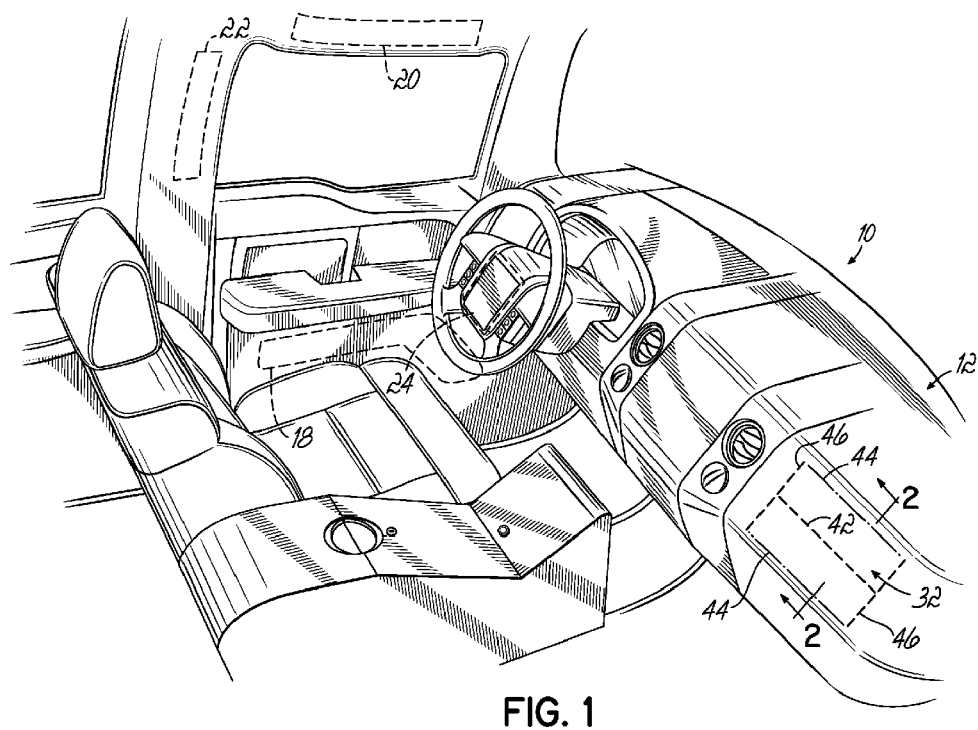
FIG. 1 is a perspective view of an automotive interior including several exemplary trim assemblies according to the present invention.

In reference to FIG. 1, an automobile 10 includes a number of exemplary trim assemblies, such as instrument panel 12, that cover the interior of the automobile 10 to provide an aesthetically pleasing environment and to enhance the comfort of the vehicle occupants. Instrument panel 12 is equipped with an airbag system 14 having an airbag cushion 16 adapted to be deployed through instrument panel 12 to protect the vehicle occupants (FIG. 2A). The various trim assemblies lining the interior of the automobile 10 are generally constructed in a similar fashion. Thus, although the following detailed description will be directed toward an instrument panel 12, those having ordinary skill in the art will recognize that the invention may equally apply to other trim assemblies in the automobile 10, such as door panels 18, roof panels 20, pillar trim panels 22, steering wheel hub panels 24, and other trim assemblies.

Figure 2B:
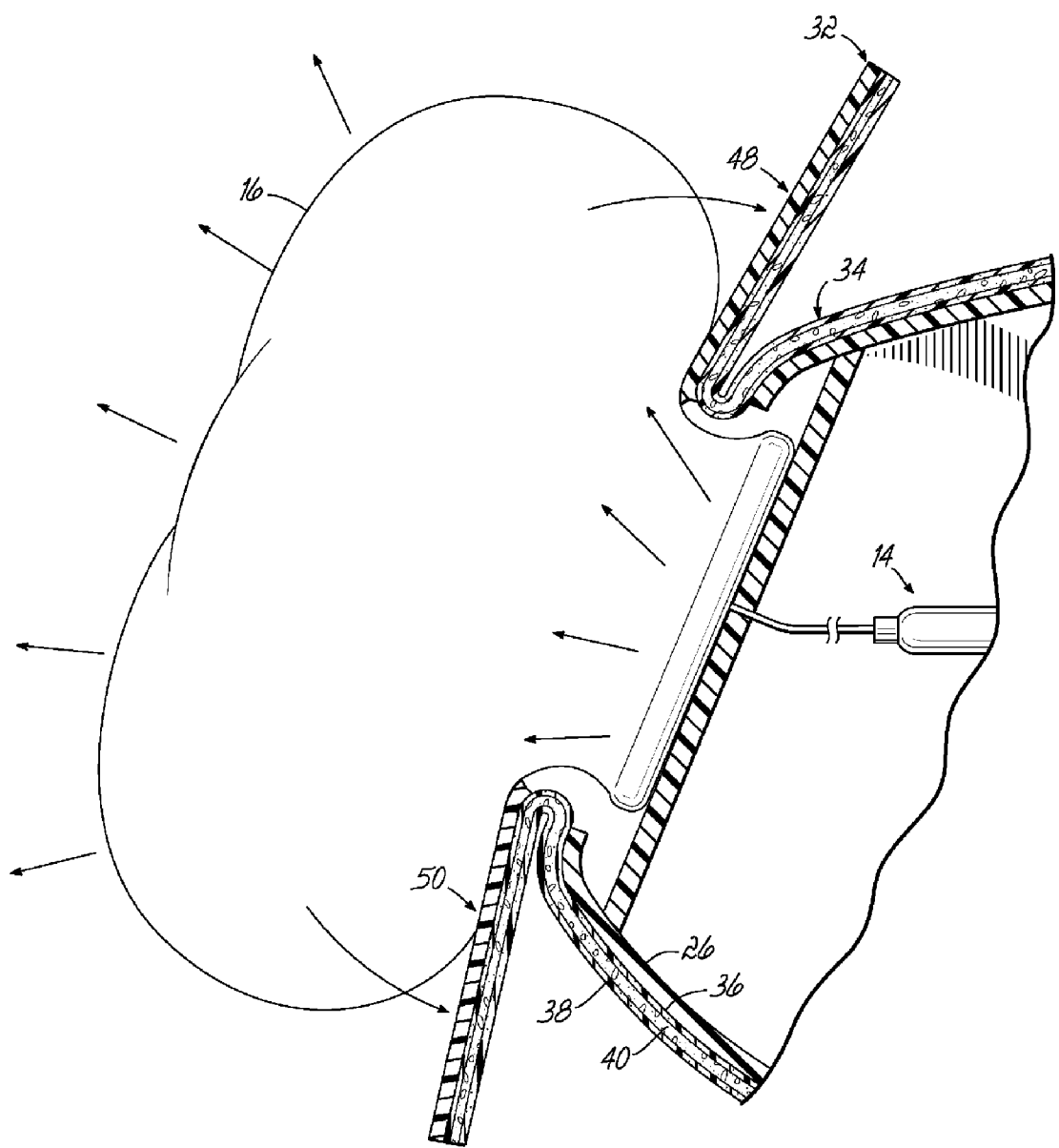
FIG. 2B is a cross-sectional view similar to FIG. 2A depicting the inflation of the airbag cushion and opening of the deployment door.

With reference to FIGS. 2A and 2B, instrument panel 12 includes a relatively rigid substrate 26, which forms at least a portion of the structural support, and defines the general shape of the instrument panel 12. The instrument panel 12 is secured to the interior of automobile 10, for example, by a bracket or mounting member (not shown) to position the instrument panel 12 in the forward portion of the passenger cabin. Substrate 26 includes a front surface 28 that faces the interior of the automobile 10 and a back surface 30 opposite the front surface 28 that is hidden from view when the instrument panel 12 is mounted to the automobile 10. The substrate 26 includes a deployment door 32 integrally molded with the substrate 26. As shown in FIG. 2A, airbag cushion 16 is located immediately behind the deployment door 32 in substrate 26 when in the stored or non-deployed state. The deployment door 32 is configured so that when the airbag system 14 is actuated, the deployment door 32 opens to allow the airbag cushion 16 to expand into the passenger compartment and protect the vehicle occupants therein, as shown in FIG. 2B.

Instrument panel 12 further includes a cover 34 that is integrally molded with the substrate 26. The cover 34 includes an inner layer or skin 36, an outer layer or skin 38, and a core 40 of a cellular material, preferably with a closed cellular structure, disposed between the inner and outer layers 36, 38. Alternatively, the cells of the core 40 may define an interconnected open-celled structure. Outer layer 38 has an exterior surface that is exposed and visible to vehicle occupants seated inside the passenger cabin when instrument panel 12 is mounted to automobile 10. The inner layer 36 may operate as a tie layer with the substrate 26. The cover 34 may be present across the full dimensions of the substrate 26 or a portion of the substrate 26 including deployment door 32 to provide a soft feel to the instrument panel 12. Typically, the appearance of the outer layer 38 is aesthetically pleasing and will match the decorative design of the automotive interior.

The instrument panel 12 is molded as a layered structure of different polymer materials by a multi-shot molding process, as described in more detail below. The substrate 26 may be made from a structurally rigid thermoplastic or thermoset polymer material like a thermoplastic polyolefin (e.g. polypropylene). The inner and outer layers 36, 38 and cellular material of the core 40 may be made from a thermoplastic polymer like a thermoplastic elastomer (TPE) compound or a polyolefin such as polypropylene. In this way, the instrument panel 12 has sufficient structural support while also having a decorative, soft feel aspect on the exposed surface of the instrument panel 12.

Advantageously, deployment door 32 is integrally molded with the substrate 26 and positioned so that airbag cushion 16 is immediately behind deployment door 32 when in a stored state, as shown in FIG. 2A. The deployment door 32 may be defined by at least one score line, and preferably a plurality of score lines in substrate 26. To this end, a plurality of score lines 42, 44 and 46 may be formed in the back surface 30 of the substrate 26. The score line 42 may function as a tear line or seam that separates when the airbag system 14 is actuated and the airbag cushion 16 expands, as shown in FIG. 2B. To this end, score line 42 is configured such that when the airbag cushion 16 expands, a tear forms through not only the substrate 26 but also through the cover 34 thereby providing the opening in the instrument panel 12 through which the airbag cushion 16 expands.

Figure 3:
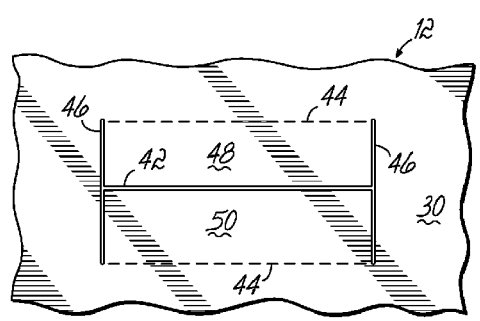
FIG. 3 is a view looking from the back of the instrument panel illustrating an exemplary score line pattern.

Score lines 44, on the other hand, may function as bend or hinge lines about which the deployment door 32 may pivot. Score lines 44 are configured such that when the airbag cushion 16 expands, the score lines 44 include at least a portion that does not tear completely through the cover 34. In this way, the cover 34 functions as a living hinge and allows the deployment door 32 to pivotally open, as shown in FIG. 2B. Additional score lines 46, which function as tear lines, are also provided along the sides of the deployment door 32 such that the score lines 42, 46 cooperate to define an H-shaped tear seam pattern, as shown in FIG. 3. The H-shaped pattern forms two deployment door panels 48 and 50 that adjoin along tear seam 42 and pivots along opposed hinge lines 44. The score lines 42, 46 may also be configured to define a U-shaped tear seam pattern (not shown) to define a single panel deployment door that pivots along a hinge line. As one of ordinary skill in the art will appreciate, the score lines may be configured in a wide variety of patterns so as to define deployment door 32.

The score lines 42, 44, 46 that define deployment door 32 represent, in essence, weakened sections of the instrument panel 12 such that when the airbag cushion 16 applies a sufficient force to the back surface 30 of the substrate 26, the deployment door 32 tears or otherwise separates from the substrate 26 and cover 34 along the score lines 42, 46 so that the airbag cushion 16 may deploy therethrough. The amount of force required to open the deployment door 32 along score lines 42, 46 may vary depending on the depth of the score lines and on the type of score line in the instrument panel 12. Those having ordinary skill in the art will recognize that the score line depth may be selectively determined or designed so that the deployment door 32 opens when the airbag cushion 16 applies a specified force thereto. To this end, and as shown in FIGS. 4A-4D, the score lines 42, 46, or at least portions thereof, may extend partially through the substrate 26, entirely through the substrate 26 or through the substrate 26 and part of the cover 34. Generally, the deeper the score line, the lower the force required to tear the substrate 26 and cover 34 to form an opening through which airbag cushion 16 may be deployed.

The type of score line also affects the amount of force required to open the deployment door. For example, the score lines may be continuously formed in the substrate 26, and possibly the cover 34, such that there are no unscored portions along the score line, such as that shown for score lines 42 and 46 in FIG. 3. Alternatively, the score lines may be intermittently formed in the substrate 26, and possibly the cover 34, so as to have scored portions and unscored portions adjacent one another, such as that shown for score lines 44 in FIG. 3. Generally, continuously formed score lines require less force to tear through the substrate 26 and cover 34 to open the deployment door 32. As one of ordinary skill in the art can appreciated, the length of the scored and unscored portions for intermittently formed score lines may be adjusted to affect the force at which the deployment door 32 opens.

Score lines 44, which form the hinge lines, preferably have a depth only partially through substrate 26, as shown in FIG. 4A. In this way, when the airbag system 14 is actuated, the substrate 26 and cover 34 bend about score lines 44 but do not become detached from instrument panel 12, thereby keeping deployment door 32 connected to the instrument panel 12. The score lines 44 may also be configured so that deployment door 32 tears or otherwise separates from the substrate 26 during deployment of the airbag cushion 16 (FIG. 2B). To this end, the score lines 44, or at least portions thereof, may extend entirely through the substrate 26 or through the substrate 26 and part of the cover 34, as shown in FIGS. 4B-4D. The depth of score lines 44 through cover 34 is however limited by the requirement that during deployment of the airbag cushion 16, the cover 34 is not completely torn through but includes at least a portion that remains in tact along score lines 44. This prevents the deployment door 32 from completely detaching from the instrument panel 12 and being ejected into the passenger cabin. As with tear lines 42, 46, score lines 44 may be formed in instrument panel 12 as continuous score lines or intermittent score lines as shown in FIG. 3. For either type of score line, however, there must be at least some portion of the cover 34 that remains coupled with the deployment door 32.

The instrument panel 12 constructed as described above has a number of advantages. One advantage is that when the airbag cushion 16 is in a stored state, the deployment door 32 is an integral part of the instrument panel 12, and is therefore not identifiable within the instrument panel 12. In this way, the invention provides a seamless trim assembly with airbag-deploying capabilities. The aesthetic aspects of the trim assembly are therefore not encumbered by incorporating the airbag system 14 therein and having the airbag cushion 16 deploy through the trim assembly. Another advantage is that the cover 34 functions as a hinge mechanism that serves to not only allow the deployment door 32 to pivotally swing open but also keeps the deployment door attached to the instrument panel 12 and therefore prevents the door 32 from being ejected into the passenger cabin when the airbag system 14 is deployed. Thus, a separate hinge mechanism is not required thereby reducing the number of parts and reducing the overall costs. Furthermore, because the hinge mechanism, i.e., at least the cover 34, is located on the front surface of the deployment door 32, as opposed to the more traditional location on the back side of the door, problems associated with hinge binding and possible malfunction of the airbag system 14 are eliminated.

Additionally, the multi-layered construction of the cover 34 provides sufficient strength to retain the deployment door 32 when the airbag system 14 is actuated. The multi-layered construction also prevents tears that initiate in the cover 34 along score lines 44 during deployment of the airbag cushion 16 from propagating completely through the cover 34. To this end, when a tear is initiated in one layer, such as inner layer 36, it may propagate completely through inner layer 36. To tear through the core 40 of the cover 34, however, the tear must be reinitiated in the core 40. If the core 40 is completely torn, the tear must then be reinitiated in outer layer 38. Thus to tear completely through the cover 34, multiple tears must be initiated in the cover 34. The multi-layered structure, therefore, reduces the likelihood of the deployment door 32 detaching from the instrument panel 12 when the airbag cushion 16 in deployed.

With reference to FIGS. 5A-5D, a method of making the instrument panel 12 of the present invention with a multi-shot process in an injection molding machine equipped with two independent injection systems for injecting different types of molten polymers will now be described. A single mold assembly 60 includes spaced-apart first and second members 62 and 64, and a mold core 66 situated between the members 62, 64. The mold core 66 has opposite first and second cavities 68, 70 each adapted to confront and mate with one of a corresponding first and second cavities 72, 74 defined in the members 62, 64. The mold core 66 is adapted to pivot so that the first and second cavities 68, 70 are confronting, in turn, with the first and second cavities 72, 74 to injection mold, in sequence, first the substrate 26, then the cover 34. While the first and second shots of the injection molding operation are described below with respect to the first cavity 68, it is understood that the first and second shots of the two-shot molding operation occur in the same fashion with respect to the second cavity 70.

Figure 5A:
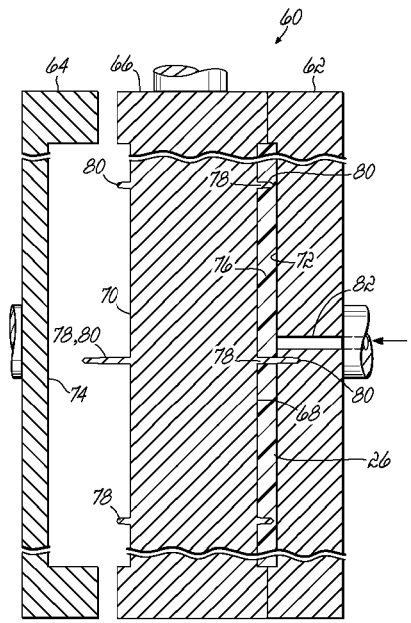
FIGS. 5A-5D are diagrammatic cross-sectional views of an injection molding operation for forming the trim assemblies of the invention.
Figure 5B:
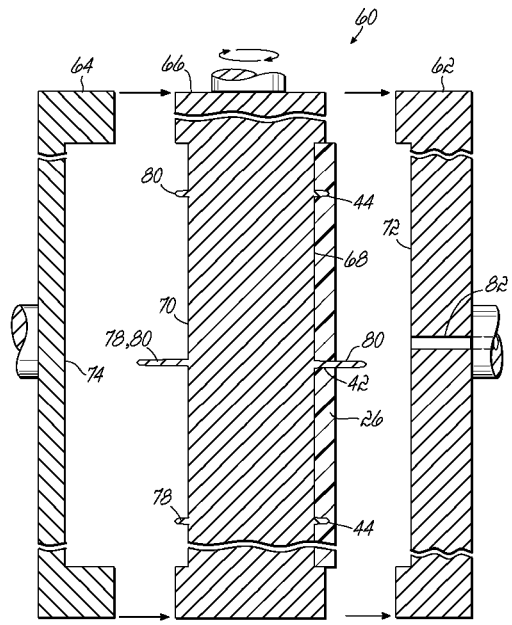

As shown in FIGS. 5A-5B, the first cavity 68 of the mold core 66 is moved into alignment with mold cavity 72 and mated with the first member 62 to define a closed first shot mold chamber 76 defined by the combined volume of cavities 68 and 72. The mold core 66 includes movable slides 78, as is known in the art, for forming the tear lines 42, 46 and hinge lines 44 in the substrate 26. In particular, movable slides 78 include a projecting portion 80 that extends into the first shot mold chamber 76 and are adjustable so as to control the distance in which the projecting portion 80 extends into the first mold chamber 76. This length determines the depth of the score lines 42, 44, 46 in substrate 26. In a first shot of the molding operation, a molten polymer suitable for forming substrate 26 is injected through a channel 82 into mold chamber 76.

Figure 5C:
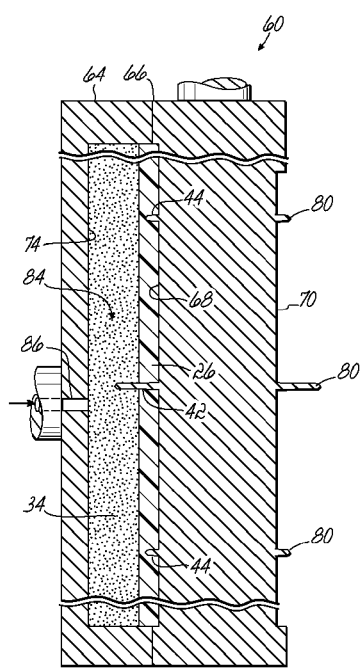
Figure 5D:
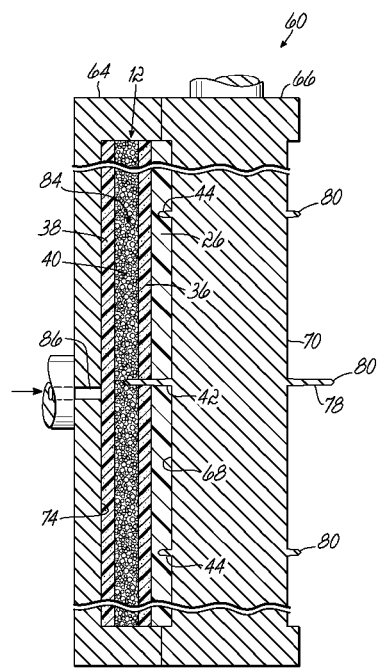

As shown in FIGS. 5B-5D, the first member 62 is moved away from the mold core 66 and core 66 is rotated so that the first cavity 68 carrying substrate 26 confronts and mates with the second cavity 74 to define a closed second shot mold chamber 84 about the substrate 26. The movable slides 78 may be adjusted so that projecting portions 80 extend beyond substrate 26 and into the second mold chamber 84. Movable slides 78 may be adjusted so as to control the distance in which projecting portion 80 extends into the second mold chamber 84. This length determines the depth of the score lines 42, 44, 46 in the cover 34. In a second shot of the two-shot molding operation, a molten polymer material having an additive blowing agent mixed therewith is injected through a channel 86 into mold chamber 84 to form the cover 34.

The injected molten polymer is activated, or foamed, as is commonly known in the art, by introducing a physical or chemical blowing agent into the molten polymer, generally prior to being injected into mold chamber 84. Generally, the blowing agent works by expanding the polymer of core 40 to produce a cellular structure having significantly less density than the polymer itself. The blowing agent may be any chemical agent that liberates gas when heated above a characteristic decomposition temperature (e.g. sodium bicarbonate that liberates $CO_2$ when heated above its decomposition temperature), any physical agent such as any gas (e.g. gaseous nitrogen), or any other known blowing agent. As the polymer cools and hardens, gas-filled bubbles originating from the blowing agent define the cellular structure throughout core 40 of a given density. Depending upon the molding conditions, the cell structure of the cured core 40 may either be closed or open. The polymer material of cover 34 may be a thermoplastic polymer like a thermoplastic elastomer or a polyolefin like polypropylene.

As the mold is cooled, portions of the molten polymer in contact with the second member 64 and the substrate 26, held by the first cavity 68, form the inner layer 36 on the surface of substrate 26 and the outer layer 38 on the exposed surface of the finished instrument panel 12. The inner and outer layers 36, 38 are substantially free of the cells found in core 40 and, therefore have a greater density than the core 40. The thickness of the layers 36, 38 is dependent upon the cooling rate of the surfaces of the molten polymer that are in contact with the second shot mold cavity 74 and the substrate 26. Cooling the molten polymer more rapidly may increase the thickness of the layers 36, 38.

After the instrument panel 12 has cooled, the second member 64 is moved away from the core 66, and the instrument panel 12 is ejected, such as by ejector pins (not shown), from the first cavity 68. The inner layer 36 is bonded, or integrally molded, with the substrate 26, and the inner and outer layers 36, 38 and core 40 are bonded or integrally molded with each other so that the substrate 26 and cover 34 define an integral structure. In addition, the core 40 of the cover 34 includes the cellular structure. The two-shot molding process is repeated to form additional instrument panels 12.

Although not illustrated, it is understood that the second cavity 70 also is adapted to confront and mate with the first member 62, during the mating of the first cavity 68 with the second member 64, to form a second substrate (not shown) identical to the first substrate 26 by injecting molten polymer into the first shot mold chamber defined by cavities 70, 72 in the first shot of the molding operation. After injection, the mold core 66 is rotated to align the second cavity 70 with cavity 74 in the second member 64 and mated to define a second shot chamber for the second shot of the molding operation while the first cavity 68 returns to a confronting relationship with cavity 72 in the first member 62 to repeat the first shot of the molding operation. In this fashion, multiple instrument panels 12 may be serially formed in a continuous and efficient manner.

Instrument panel 12 or, at the least, cover 34 may also be formed by other multi-component molding processes known to those skilled in the art. For example, cover 34 may be formed by a co-injection molding process in which two or more molten polymers are sequentially or simultaneously injected into the same mold to form inner and outer layers 36, 38 surrounding a cellular core 40.

Figure 6:
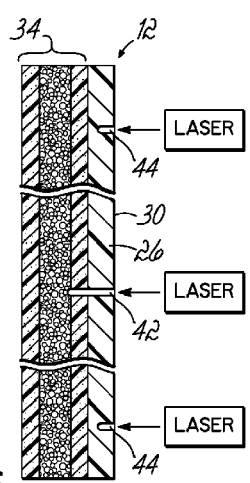
FIG. 6 is a diagrammatic cross-sectional view of a laser scoring process for forming the score lines in the trim assembly.

In another embodiment of the invention, instead of forming the score lines 42, 44, 46 in the instrument panel 12 during the molding operation, the score lines 42, 44, 46 that define the deployment door 32 may be formed in the instrument panel 12 in an additional processing step. In particular, the instrument panel 12 may be formed essentially as described above except that there are no moveable slides 78 with projecting portions 80 extending into the first and second mold chambers 76, 78. In this embodiment, when the instrument panel 12 is ejected from the mold assembly 60, the instrument panel 12 is moved to a processing station where the score lines 42, 44, 46 are formed in the instrument panel 12 through a laser scoring process, as shown in FIG. 6. As is well known in the art, laser scoring focuses a high-energy light beam that vaporizes or otherwise removes material from a workpiece, such as a plastic substrate. Using a laser scoring process, the score lines 42, 44 having, for example the H-shaped pattern, may be formed by focusing a laser beam on the back surface 30 of the substrate 26 and moving the laser in the desired H-shaped pattern. The depth of the score lines 42, 44, 46 may be controlled, for example, by controlling the amount of time the laser remains fixed on a specific location on the instrument panel 12. By varying this time, the desired depth of the score lines 42, 44, 46 may be achieved such that the deployment door 32 opens when a specified force is applied thereto. The laser scoring process may also be used to form continuous or intermittent score lines. Those of ordinary skill in the art will recognize other ways of using laser scoring to achieve the desired depth or type of the score lines.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An automotive interior trim assembly adapted to have an airbag deploy therethrough, comprising:
   a substrate with a deployment door integrally molded therewith, said substrate having a front surface adapted to face an automotive interior and a back surface opposite to said front surface, the airbag adapted to be stored behind said deployment door prior to actuation, said deployment door adapted to open when the airbag is actuated; and
   a cover molded onto said substrate and said deployment door, said cover including an inner and outer layer of a polymer material having a substantially non-cellular structure and a core of said polymer material having a cellular foam structure positioned between said inner and outer layers, wherein said cover is adapted to keep said deployment door attached to the trim assembly when the airbag is actuated and opens the deployment door.

2. The trim assembly of claim 1, wherein said deployment door includes a perimeter which is defined by at least one score line.

3. The trim assembly of claim 2, wherein at least a portion of said score line extends entirely through said substrate.

4. The trim assembly of claim 2, wherein at least a portion of said score line extends partially through said cover.

5. The trim assembly of claim 2, wherein said score line is configured as a continuous score line.

6. The trim assembly of claim 2, wherein said score line is configured as an intermittent score line.

7. The trim assembly of claim 1, wherein said substrate includes a material selected from the group consisting of a thermoplastic polymer and a thermoset polymer.

8. The trim assembly of claim 1, wherein said polymer material forming said cover is selected from the group consisting of a thermoplastic elastomer compound and a polyolefin.

9. The trim assembly of claim 1 configured as an instrument panel.

10. The trim assembly of claim 1 configured as a steering wheel hub panel.

11. The trim assembly of claim 1 configured as a pillar trim panel.

12. The trim assembly of claim 1 configured as a door panel.

13. The trim assembly of claim 1, wherein said inner layer, outer layer, and core of said cover are formed as a unitary structure.

14. The trim assembly of claim 1, wherein said inner layer of said cover contacts the front surface of said substrate.

* * * * *